US012810681B2

(12) United States Patent
Knight et al.

(10) Patent No.: US 12,810,681 B2
(45) **Date of Patent: *Nov. 24, 2026**

(54) GAMING SYSTEMS AND METHODS USING DYNAMIC MODIFIERS

(71) Applicant: LNW Gaming, Inc., Las Vegas, NV (US)

(72) Inventors: Jamie Knight, Henderson, NV (US); Christopher Guerrero, Las Vegas, NV (US); Jeremy Hornik, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 187 days.

This patent is subject to a terminal disclaimer.

(21) Appl. No.: 18/934,711

(22) Filed: Nov. 1, 2024

(65) Prior Publication Data

US 2025/0061768 A1 Feb. 20, 2025

Related U.S. Application Data

(63) Continuation of application No. 18/461,639, filed on Sep. 6, 2023, now Pat. No. 12,175,832, which is a continuation of application No. 17/671,790, filed on Feb. 15, 2022, now Pat. No. 11,798,350, which is a continuation of application No. 17/181,065, filed on Feb. 22, 2021, now Pat. No. 11,557,169, which is a continuation of application No. 16/593,752, filed on Oct. 4, 2019, now Pat. No. 10,957,147.

(51) Int. Cl.
*G07F 17/32* (2006.01)
*G07F 17/34* (2006.01)

(52) U.S. Cl.
CPC ...... *G07F 17/3213* (2013.01); *G07F 17/3225* (2013.01); *G07F 17/3267* (2013.01); *G07F 17/3209* (2013.01); *G07F 17/34* (2013.01)

(58) Field of Classification Search
None
See application file for complete search history.

(56) References Cited

U.S. PATENT DOCUMENTS 7,237,775 B2 7/2007 Thomas et al.
7,252,589 B1 8/2007 Marks et al.
7,322,887 B2 1/2008 Belger et al.
7,654,895 B2 2/2010 Pacey
7,704,141 B1 4/2010 Marks et al.
(Continued)

*Primary Examiner* — Omkar A Deodhar

(57) ABSTRACT

A gaming system includes a gaming machine and game-logic circuitry. The gaming machine includes a display device configured to display (i) a symbol array comprising a plurality of symbols and (ii) a modifier array comprising a plurality of modifiers. The game-logic circuitry is configured to select, for a plurality of rounds of populating the symbol array with symbols, a subarray of the modifier array. The selected subarray is displayed by the display device. The game-logic circuitry is further configured to generate, using a random-number generator, one or more random numbers to determine an outcome of a round of the plurality of rounds, modify the subarray in response to the outcome of the round including a selection symbol, and apply, in response to a trigger round of the plurality of rounds, the modifiers of the subarray to an outcome associated with the trigger round.

20 Claims, 10 Drawing Sheets

(56) References Cited

U.S. PATENT DOCUMENTS

| | | | | |
|---|---|---|---|---|
| 7,744,453 | B2 | 6/2010 | Pacey | |
| 8,105,145 | B2 | 1/2012 | Jaffe | |
| 8,262,455 | B2 * | 9/2012 | Caputo | G07F 17/3211 463/16 |
| 8,371,920 | B2 | 2/2013 | Gomez et al. | |
| 8,454,429 | B2 | 6/2013 | Jaffe et al. | |
| 8,795,059 | B2 | 8/2014 | Aoki et al. | |
| 8,795,068 | B2 | 8/2014 | Belger et al. | |
| 8,834,258 | B2 | 9/2014 | Gobe et al. | |
| 11,423,742 | B2 * | 8/2022 | Harris | G07F 17/3255 |
| 2003/0054875 | A1 | 3/2003 | Marks et al. | |
| 2006/0068873 | A1 | 3/2006 | Gomez | |
| 2007/0060261 | A1 | 3/2007 | Gomez | |
| 2007/0087805 | A1 | 4/2007 | Taylor | |
| 2008/0076513 | A1 | 3/2008 | Esses et al. | |
| 2014/0179401 | A1 | 6/2014 | Taylor | |
| 2015/0057069 | A1 * | 2/2015 | Lafky | G07F 17/3274 463/20 |
| 2018/0033253 | A1 * | 2/2018 | Vann | G07F 17/3246 |

* cited by examiner

GAMING SYSTEMS AND METHODS USING DYNAMIC MODIFIERS

CROSS-REFERENCE TO RELATED APPLICATIONS

This patent application is a continuation of U.S. patent application Ser. No. 18/461,639, filed Sep. 6, 2023, which is a continuation of U.S. patent application Ser. No. 17/671,790, filed Feb. 15, 2022, now U.S. Pat. No. 11,798,350, which is a continuation of U.S. patent application Ser. No. 17/181,065, filed Feb. 22, 2021, now U.S. Pat. No. 11,557,169, which is a continuation of U.S. patent application Ser. No. 16/593,752, filed Oct. 4, 2019, now U.S. Pat. No. 10,957,147, the contents of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2019-2024, LNW Gaming, Inc.

FIELD OF THE INVENTION

The present disclosure relates generally to gaming systems, apparatus, and methods and, more particularly, to dynamic selection of modifiers for a set of game rounds.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

As the industry matures, the creativity and ingenuity required to improve such operation of gaming apparatus and games grows accordingly.

SUMMARY

According to one aspect of the present disclosure, a gaming system includes a gaming machine and game-logic circuitry. The gaming machine includes a display device configured to display (i) a symbol array comprising a plurality of symbols and (ii) a modifier array comprising a plurality of modifiers. The game-logic circuitry is configured to select, for a plurality of rounds of populating the symbol array with symbols, a subarray of the modifier array. The selected subarray is displayed by the display device. The game-logic circuitry is further configured to generate, using a random-number generator, one or more random numbers to determine an outcome of a round of the plurality of rounds, modify the subarray in response to the outcome of the round including a selection symbol, and apply, in response to a trigger round of the plurality of rounds, the modifiers of the subarray to an outcome associated with the trigger round. The gaming system may be incorporated into a single, freestanding gaming machine.

According to another aspect of the present disclosure, a method of applying modifiers to a symbol game using a gaming system comprising game-logic circuitry and a gaming machine with a display device in communication with the game-logic circuitry is provided. The method includes displaying, via the display device, a symbol array comprising a plurality of symbols and a modifier array comprising a plurality of modifiers selecting, by the game-logic circuitry and for a plurality of rounds of populating the symbol array with symbols, a subarray of the modifier array that is displayed by the display device, generating, using a random-number generator of the game-logic circuitry, one or more random numbers to determine an outcome of a round of the plurality of rounds, modifying, by the game-logic circuitry in response to the outcome of the round including a selection symbol, the subarray, and applying, by the game-logic circuitry in response to a trigger round of the plurality of rounds, the modifiers of the subarray to an outcome associated with the trigger round.

According to yet another aspect of the present disclosure, a gaming machine is provided. The gaming machine includes a display device that displays a symbol array comprising a plurality of symbols and a modifier array comprising a plurality of modifiers, and game-logic circuitry. The game-logic circuitry selects, for a plurality of rounds of populating the symbol array with symbols, a subarray of the modifier array that is displayed by the display device, generates, using a random-number generator of the game-logic circuitry, one or more random numbers to determine an outcome of a round of the plurality of rounds, modifies, in response to the outcome of the round including a selection symbol, the subarray, and applies, in response to a trigger round of the plurality of rounds, the modifiers of the subarray to an outcome associated with the trigger round.

Additional aspects of the invention will be apparent to those of ordinary skill in the art in view of the detailed description of various embodiments, which is made with reference to the drawings, a brief description of which is provided below.

Figure 1:
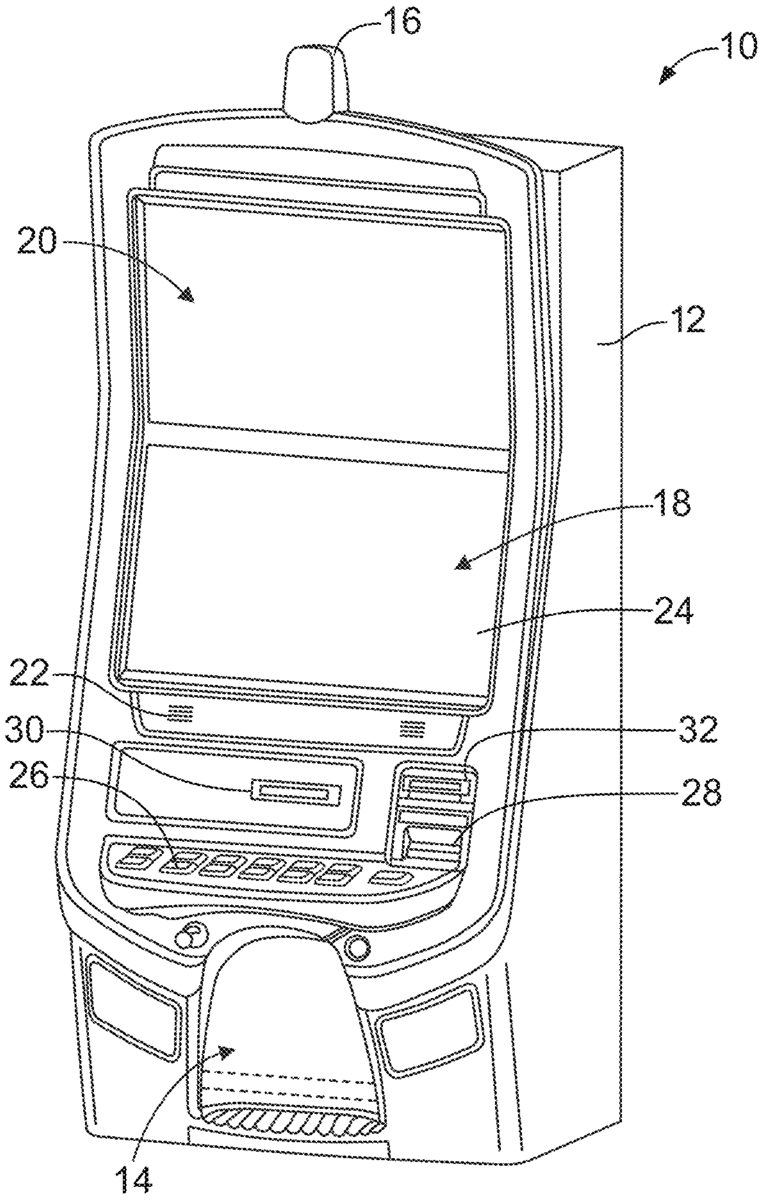
FIG. 1 is a perspective view of a free-standing gaming machine according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Systems and methods described herein are related to wagering games having a dynamic modifier array from which one or more modifiers are chosen at a periodic interval to the wagering games. That is, a subset of modifiers from the modifier array may be in a "selected" state during play of a game. The selected modifiers may change in response to trigger conditions, such as particular symbols in present in outcomes of the wagering games, until a trigger event (e.g., a trigger spin, a trigger outcome, expiration of a period of time, etc.) occurs. In response to the trigger event, the selected modifiers are applied to the current outcome of the wagering game. The anticipation of collecting desirable modifiers and the dynamic nature of the modifier selection may enhance the excitement of the underlying wagering games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
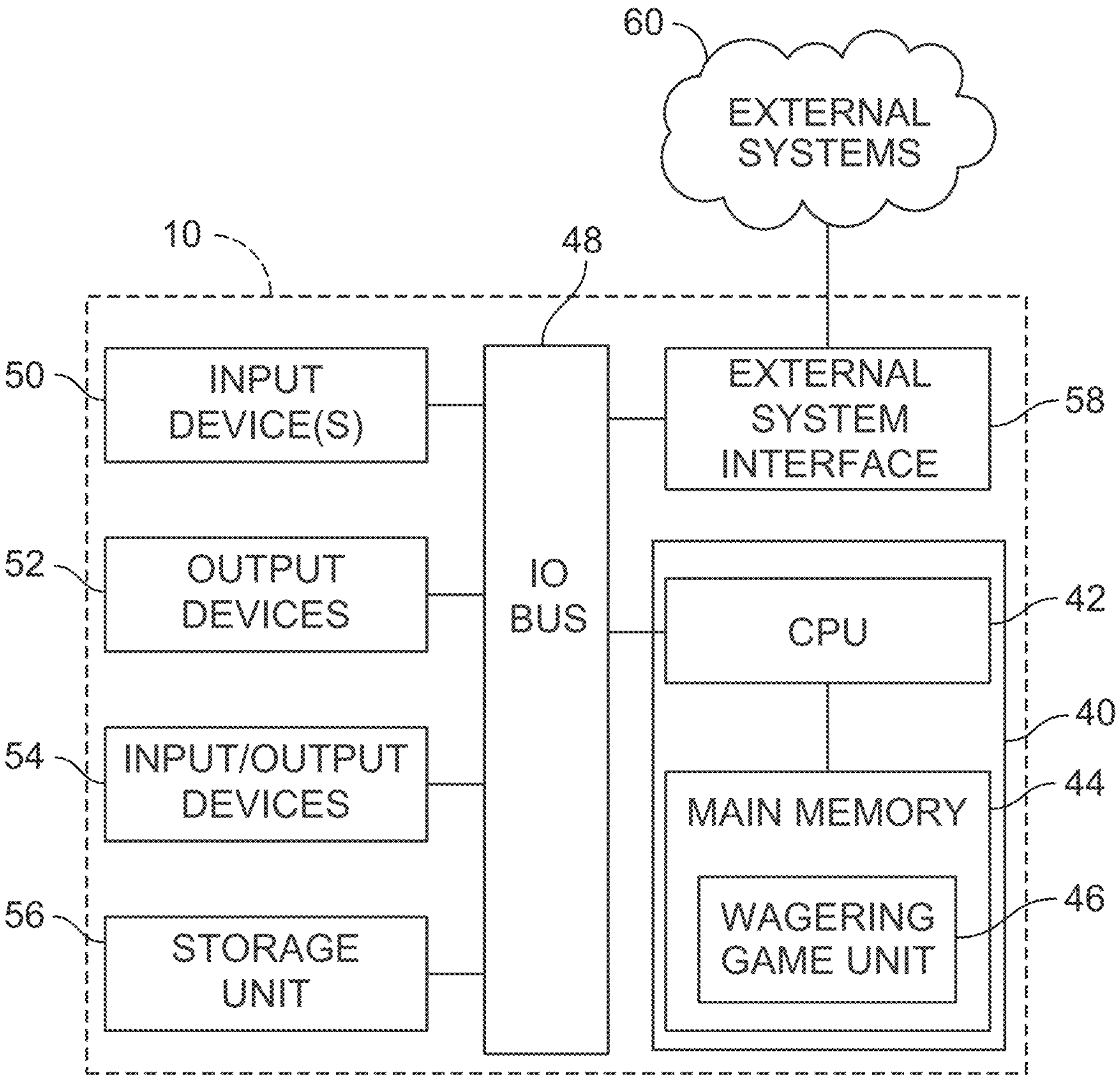
FIG. 2 is a schematic view of a gaming system according to an embodiment of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
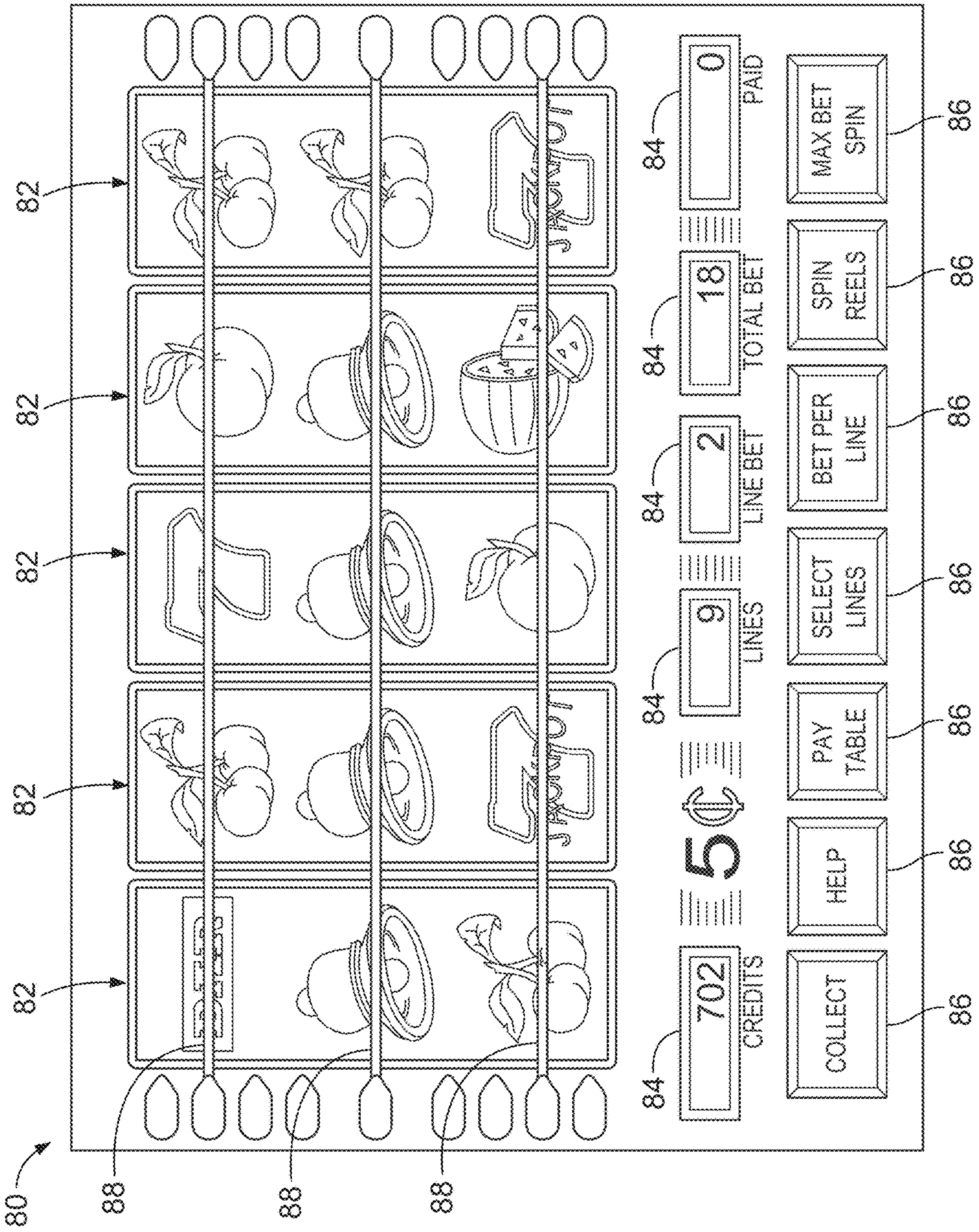
FIG. 3 is an image of an exemplary basic-game screen of a wagering game displayed on a gaming machine, according to an embodiment of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
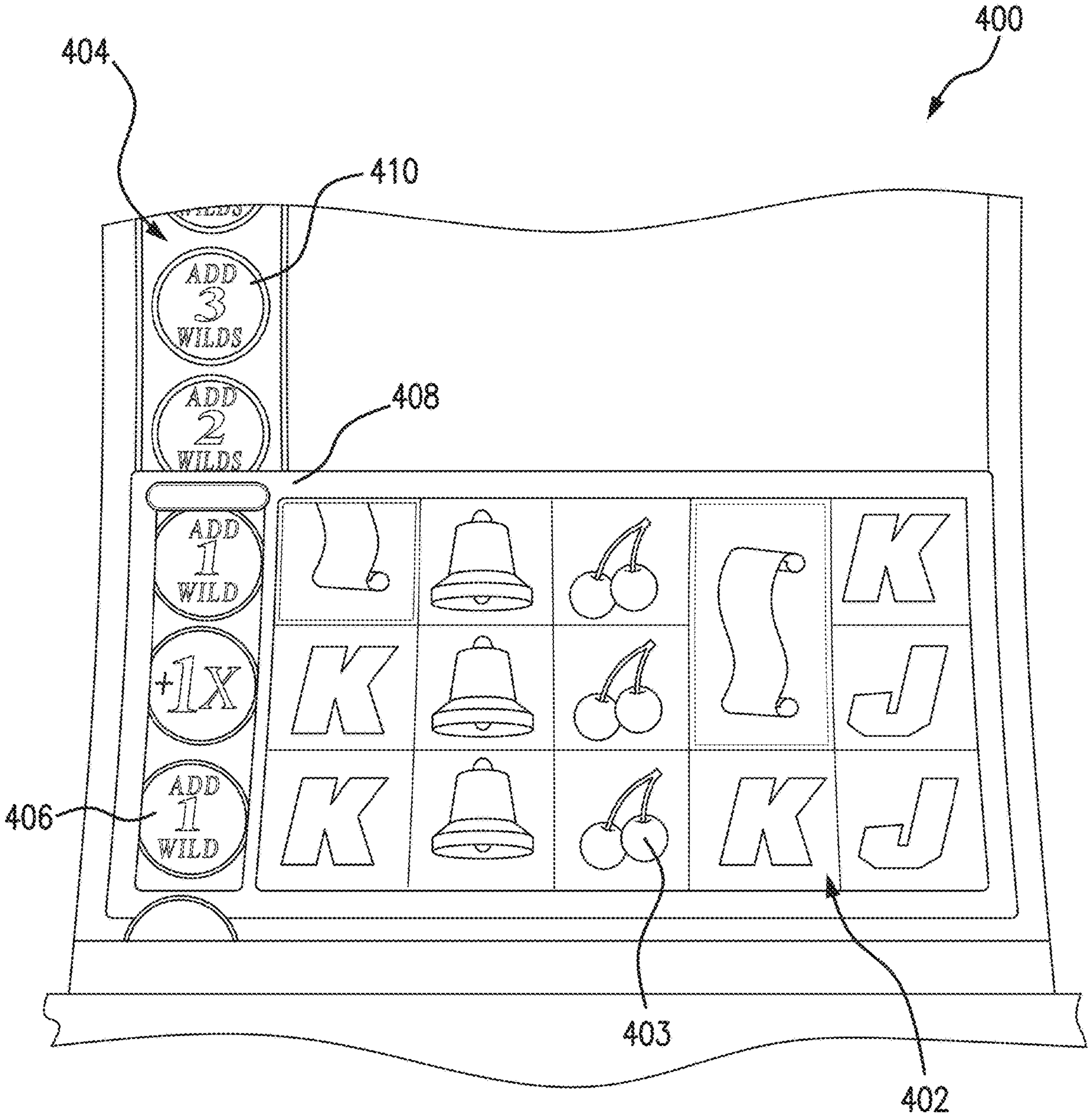
FIG. 4 is an example graphical interface of a wagering game including a modifier array in accord with at least some aspects of the disclosed concepts.

Referring now to FIG. 4, an example gaming interface 400 of a wagering game is provided. The interface 400 includes a symbol array 402 and a modifier array 404. In other embodiments, the interface 400 may include additional, fewer, or alternative elements in a suitable configuration, including those described elsewhere herein.

The symbol array 402 is configured to be populated by a plurality of symbols 403 at a plurality of symbol positions of the symbol array 402. In the example embodiment, the symbol array 402 is populated by symbols 403 from a plurality of symbol-bearing reels. The symbol-bearing reels may be associated with one or more symbol positions of the symbol array 402. During each round or spin, symbols from the reels move through the symbol array 403 as the reels spin, either mechanically or graphically depending on the type of reels (mechanical or graphical). As used herein, a "spin" or "round" refers to a set of collective actions, animations, functions, and the like associated with an outcome of the game. That is, a round may include a wager, user input initiating the wager and the round, a graphical or mechanical animation populating the symbol array 402, and/or awarding the player for a winning outcome. In other embodiments, the symbol array 402 may not be populated by symbols from reels, but rather is populated using another suitable form of symbol population. For example, the symbol array 402 may be populated with random symbols 403.

The modifier array 404 is a data structure configured to include one or more modifiers that may be applied to an outcome of the wagering game using the symbol array 402. The modifier array 404, unlike the symbol array 402 in which each symbol position is visible at all times during the wagering game, may be partially blocked from sight by the player at a given time. That is, the modifier array 404 may be akin to a symbol-bearing reel in which only a portion of the reel is visible to the player. In other embodiments, the modifier array 404 may be fully visible, or the modifier array 404 may be obscured in a different suitable form. For example, the modifier array 404 may be a wheel as described herein.

In the example embodiment, the modifier array 404 includes modifiers 406. One or more types of modifiers (e.g., Wild Stack, Multipliers, Upgrade Symbol, Add Wilds, etc.) may be included within the modifier array 404. When applied, these modifiers may change the symbols shown in the symbol array 402 for one or more outcomes. In certain embodiments, the modifiers may make changes to the reels themselves (e.g., changing a symbol on the reel), and/or the modifiers may affect one or more elements external to the wagering game. In certain embodiments, the modifier array 404 may also include blanks. The blanks do not apply any modifier or change to the wagering game but still occupy array positions within the modifier array 404. In other embodiments, additional, fewer, or alternative elements may be included within the modifier array 404. In one example, the modifier array 404 may include bonus symbols (not shown) that award a bonus award.

The modifier array 404 may include a predetermined number and/or sequence of modifiers 406, such as to form a reel strip or wheel. In other embodiments, particularly embodiments in which the modifier array 404 is partially hidden from sight of the player or the modifier array 404 receives modifiers 406 from a source hidden from the player, the structure of the modifier array 404 may be randomly determined over time. That is, array positions and/or modifiers 406 within the array positions may be added, removed, and/or replaced during play of the wagering game. The modifiers 406 added to the modifier array 404 may be randomly determined or retrieved from one or more predefined sequences of modifiers 406 stored in memory.

In the example embodiment, modifiers 406 from the modifier array 404 are not applied for each round, but rather are applied to the symbol array 402 once for a plurality of rounds. More specifically, a portion of the modifier array 404, in response to one or more trigger conditions of a plurality of rounds, is applied to the symbol array 402 such that modifiers 406 within the portion are applied to the symbol array 402. In the example embodiment, the portion of the modifier array 404 is referred to herein as the "selected subarray" or "subarray". The selected subarray includes encapsulates one or more array positions of the modifier array 404 and the modifiers 406 within the encapsulated array positions. In some embodiments, the selected subarray may be restricted to an array size less than an array size of the modifier array 404. That is, the modifier array 404 includes at least one array position that is not within the selected subarray. In other embodiments, the selected subarray may encompass the modifier array 404 as a whole. The selected subarray may be stored separate from the modifier array 404 (i.e., the array positions encompassed by the selected subarray are stored separately for the subarray and the modifier array 404) or as one or more pointers that reference the modifier array 404.

The game-logic circuitry 40 (shown in FIG. 2) is configured to select the subarray from the modifier array 404 and detect one or more trigger conditions during play of a casino wagering game that are associated with the selected subarray. If the trigger conditions are detected, the modifiers 406 within the array positions of the selected subarray are applied to the symbol array 402. In the example embodiment, the modifiers 406 are applied to an outcome of the symbol array 402. In other embodiments, such as embodiments including symbol-bearing reels, the modifiers 406 may be applied prior to a spin of the reels, and the resulting outcome of the symbol array 402 may or may not include the modifiers 406 from the selected subarray. The selected subarray may then be reset or changed to select a new set of array positions from the modifier array 404 (which may include some of the array positions from the previous subarray). In one example, the subarray "shifts" over a number of array positions to a new selection.

In the example embodiment, the trigger condition to apply the selected subarray is a trigger round or spin of the symbol array 402. That is, in response a predetermined round of populating the symbol array 402 with symbols, the modifiers of the selected subarray are applied to the symbol array 402. In some embodiments, the trigger round may be the final round within a plurality of rounds. For example, if the plurality of rounds is ten rounds, the trigger round is the tenth round. In other embodiments, the trigger round may be a different round within the plurality of rounds. The game-logic circuitry 40 may randomly determine which round is a trigger round.

In the example embodiment, the selected subarray remains visible to the player throughout the plurality of rounds. More specifically, the selected subarray is identifiable by boundary box 408 that encompasses the modifiers 406 within the selected subarray. In the example embodiment, the boundary box 408 also encompasses the symbol array 402. In some embodiments, the boundary box 408 may only encompass the selected subarray. In other embodiments, other suitable indicators may be used to identifier the selected subarray. For example, for a modifier array 404 presented as a wheel, a pointer or radial selector may indicate the selected subarray. In the example embodiment, one or more unselected modifiers 410 from the modifier array 404 may also be visible outside of the boundary box 408 to the player. The unselected modifiers 410 may be visible to the player to facilitate excitement regarding changes to the selected subarray, which may change to include the unselected modifiers 410.

During play of the game including the symbol array 402, one or more symbols may be used to modify the selected subarray. As used herein, "modifying" the selected subarray may include several forms of modification including, but not limited to, adding or removing array positions from the modifier array 404 to be included within the subarray, shifting the subarray a number of array positions, reorganizing the array positions or modifiers 406 within the subarray, and/or changing the modifiers 406 in the subarray. Modifications to the selected subarray may be indicated to the player via visible changes to the modifiers 406 within the selected subarray and/or changes to the boundary box 408 (e.g., the boundary box increases in size).

In the example embodiment, the symbol array 402 may include one or more selection symbols as described herein. The selection symbols may cause a particular modification to the subarray if the selection symbol is present within an outcome of a round. The selection symbols may be additive to each other such that each modification to the selected subarray is applied for outcomes having multiple selection symbols, or the selection symbols may have a priority ranking such that the selection symbol with the highest priority is applied by the game-logic circuitry 40 to modify the subarray. The modifications from at least some of the selection symbols may be unrestricted (e.g., shifting the subarray can occur without restriction), while other selection symbols may be limited in the number of modifications that may occur. For example, expanding the selected subarray may be limited by the array size of the modifier array 404 and/or the number of array positions that may be displayed at a given time. In at least some embodiments, the modifications from the selection symbols may be reset in response to the modifiers 406 within the selected subarray being applied. In other embodiments, in addition to or in place of selection symbols, the modification of the selected subarray may be in response to predetermined combinations of symbols (with or without selection symbols included) occurring within the outcomes of the symbol array 402. In further embodiments, other suitable triggers may be used to modify the selected subarray, such as modifications purchased directly by the player.

Figure 5:
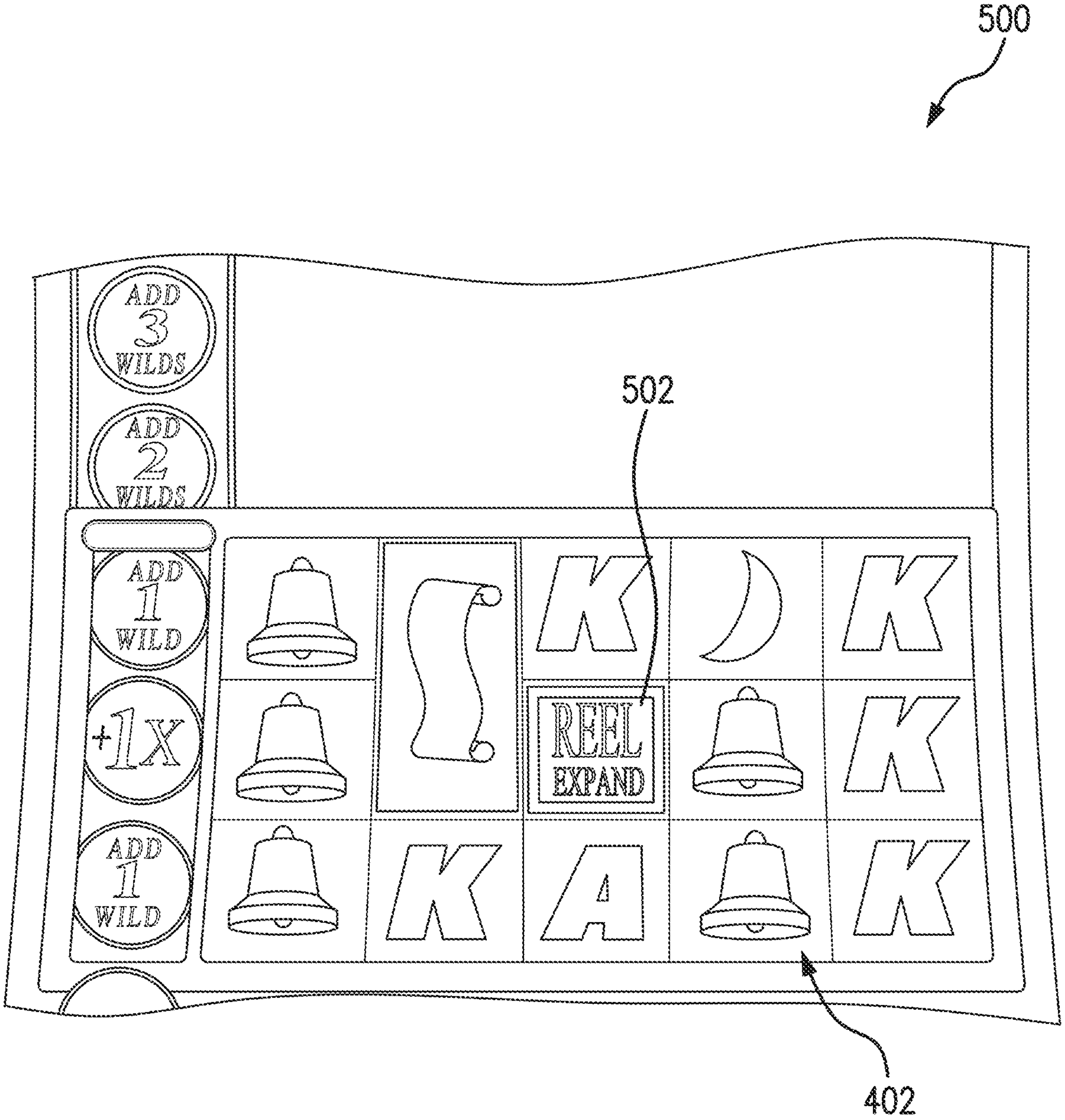
FIG. 5 is an example graphical interface of the wagering game shown in FIG. 4 with a reel expansion symbol present in a symbol array in accord with at least some aspects of the disclosed concepts.

FIG. 5 is a gaming interface 500 similar to the interface 400 shown in FIG. 4. The gaming interface 500 depicts an outcome of a round of the symbol array 402 being populated by symbols that include a selection symbol. More specifically, the selection symbol is an expansion symbol 502. The expansion symbol 502 increases the number of array positions of the modifier array 404 that are encompassed by the selected subarray. In the example embodiment, each expansion symbol 502 within an outcome increases the array size of the selected subarray by one array position up to a maximum limit (e.g., the array size of the modifier array and/or the number of array positions visible on the interface 500). In other embodiments, each expansion symbol may cause the selected subarray to increase in array size by a different number of array positions. In one example, the game-logic circuitry 40 may randomly determine how many array positions are added to the selected subarray for each expansion symbol 502.

Figure 6:
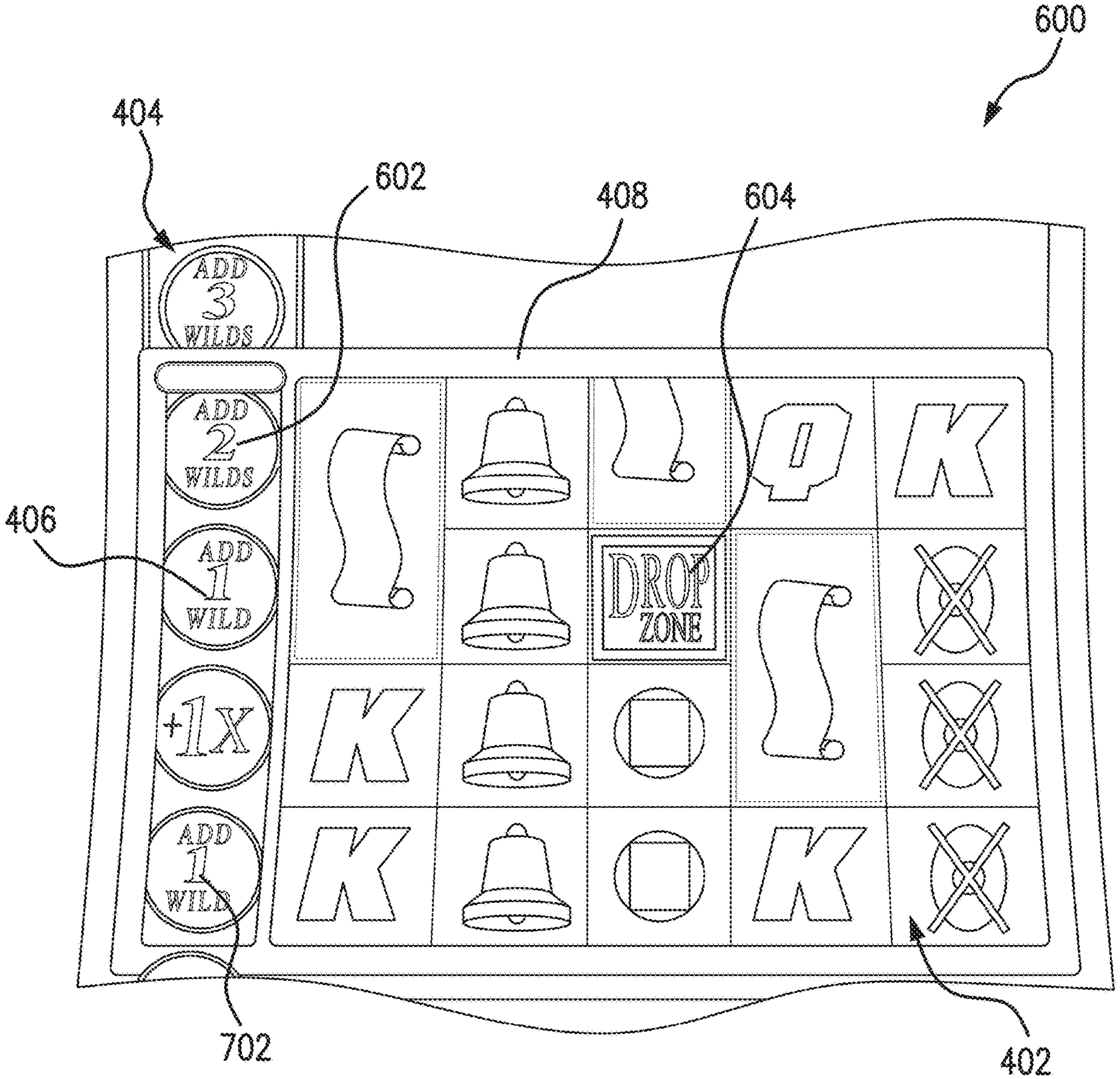
FIG. 6 is an example graphical interface of the wagering game shown in FIG. 4 after a reel expansion and with a selection symbol present in the symbol array in accord with at least some aspects of the disclosed concepts.

FIG. 6 depicts an example gaming interface 600 of an outcome following the outcome displayed in FIG. 5. More specifically, the boundary box 408 has increased in size to include an additional modifier 602 within the modifier array 404, and the symbol array 402 has likewise increased in size to include another row of symbols.

The additional modifier 602 was not previously in the boundary box 408 as shown in FIG. 5. The expansion symbol 502 causes game-logic circuitry 40 to modify the selected subarray to include the additional modifier 602 and cause the interface 600 to be updated to include the additional modifier 602 within the boundary box 408. In the example embodiment, the additional modifier 602 occupied (in a data-structure sense) an array position adjacent to the selected subarray, which was increased in array size to include the array position of the additional modifier 602. The increased array size of the selected subarray may persist until the modifiers 406 within the subarray are applied to the symbol array 402 or until another expansion symbol 502 is included in an outcome of the symbol array 402. In response to the modifiers 406 of the subarray being applied, the expanded boundary box and array size of the selected subarray may be reset to a default size (e.g., three array positions).

In the example embodiment, the symbol array 402 may also be increased to include more symbol positions in response to the expansion symbol 502. As shown in the interface 600, the symbol array 402 includes an additional row of symbol positions to be populated by symbols. As the boundary box 408 changes, the number of symbol positions within the symbol array 402 may change. In other embodiments, particularly embodiments in which the boundary box 408 is not shared between the symbol array 402 and the selected subarray, the symbol array 402 may have a fixed number of symbol positions or be unaffected by the expansion symbol 502.

The interface 600 also includes another example selection symbol. More specifically, the interface 600 includes a shift symbol 604 within the symbol array 402. The shift symbol 604, when present in an outcome of a round, causes the game-logic circuitry 40 to shift the array positions within the selected subarray. That is, the array size of the selected subarray does not change, but the array positions of the modifier array 404 that are encompassed by the selected subarray change. For example, if the modifier array 404 includes five array positions and a selected subarray encompasses the first three array positions of the modifier array 404, an example shift would cause the selected subarray to encompass the second, third, and fourth array positions of the modifier array 404.

Figure 7:
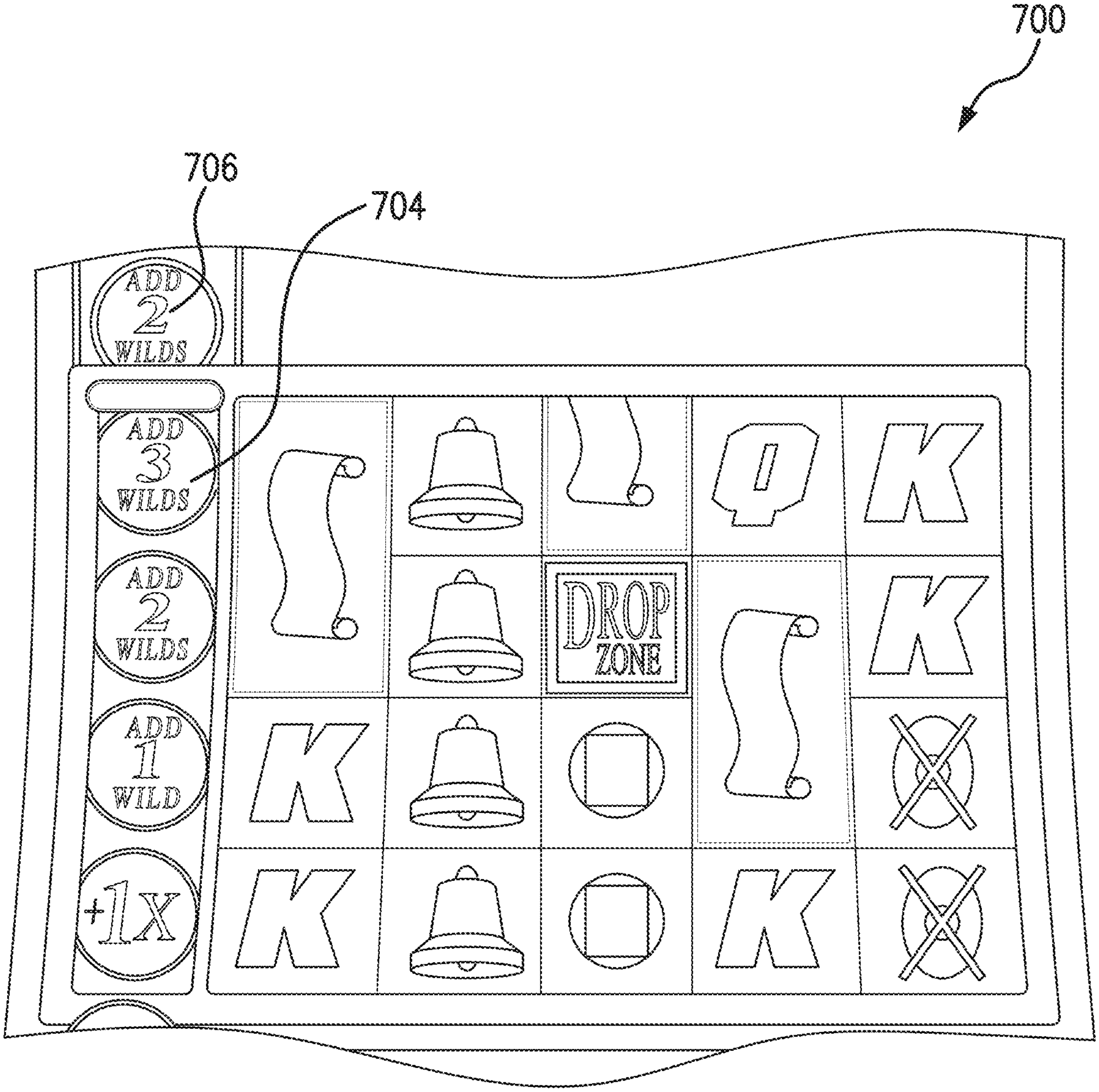
FIG. 7 is an example graphical interface of the wagering game shown in FIG. 4 after selection symbol has been applied to the modifier reel in accord with at least some aspects of the disclosed concepts.

FIG. 7 is an example gaming interface 700 depicted an outcome of a round after the outcome in the interface 600. More specifically, the interface 700 depicts the result of a single position shift caused by the shift symbol 604. The selected subarray has been shifted by a single array position such that one array position is gained and another array position is removed from the selected subarray. With reference to FIGS. 6 and 7, a first modifier 702 present in the interface 600 as part of the selected subarray has been hidden from sight in the interface 700, while a second modifier 704 has moved from outside the boundary box 408 in the interface 600 to inside the boundary box 408 in the interface 700. The other remaining modifiers 406 have similarly moved one position downward from the gaming interface 600 to the interface 700, and a third modifier 706 has become visible in the interface 700. The transition between the two interfaces 600, 700 may be animated by scrolling the modifier array 404 downward by a single position. From a data structure viewpoint, the visible changes correspond to the first modifier 702 being removed from the selected subarray and the second modifier 704 being added to the selected subarray.

In the example embodiment, each shift symbol 604 within an outcome causes the selected subarray to shift by one array position. In other embodiments, each shift symbol may cause the selected subarray to shift by a different number of array positions. In certain embodiments, game-logic circuitry 40 randomly determines the number of array positions shifted by the selected subarray in response to each shift symbol 604.

The interface 700, in addition to the effect of the shift symbol 604, illustrates a persistence to the selection symbols. More specifically, the effect of the expansion symbol 502 shown in FIG. 5 remains despite an intermediate outcome between the outcome depicted by the interface 500 and the outcome depicted by the interface 700. The effects of the selection symbols may persist until subsequent selection symbols change the effect and/or a trigger round (and its corresponding outcome) occurs. The persistence is used because the modifiers 406 may not be applied to every outcome, and the selection symbols change the subarray to create heightened player anticipation of receiving a "good" combination of modifiers for the trigger round. In addition, to increase the player anticipation, for outcomes including multiple selection symbols (e.g., one expansion symbol 502 and one shift symbol 604), every modification from the selection symbols may be applied to the selected subarray.

The expansion symbol 502 and the shift symbol 604 are two examples of selection symbols, and other selection symbols may be included. For example, if the modifier array 404 includes blanks in addition to the modifiers 406, the available selection symbols may include an elimination symbol that removes blanks from the selected subarray to add additional modifiers 406 from the modifier array 404 in place of the removed blanks. The selection symbols may include an upgrade symbol that upgrades one or more modifiers 406 within the modifier array 404. In another example, the selection symbols may include a swap symbol that swaps modifiers between two or more array positions. In certain embodiments, the selection symbols may include symbols that counteract the effects of other selection symbols. For example, the selection symbols may include a reduction symbol that counteracts the expansion symbol 502, and/or an opposite shift symbol that causes the selected subarray to be shifted in a direction opposite the direction caused by the shift symbol 604. In addition, although the expansion symbol 502 and the shift symbol 604 are depicted only on the central column of the symbol array 402, it is to be understood that the selection symbols may occur at any suitable symbol position within the symbol array 402.

Figure 8:
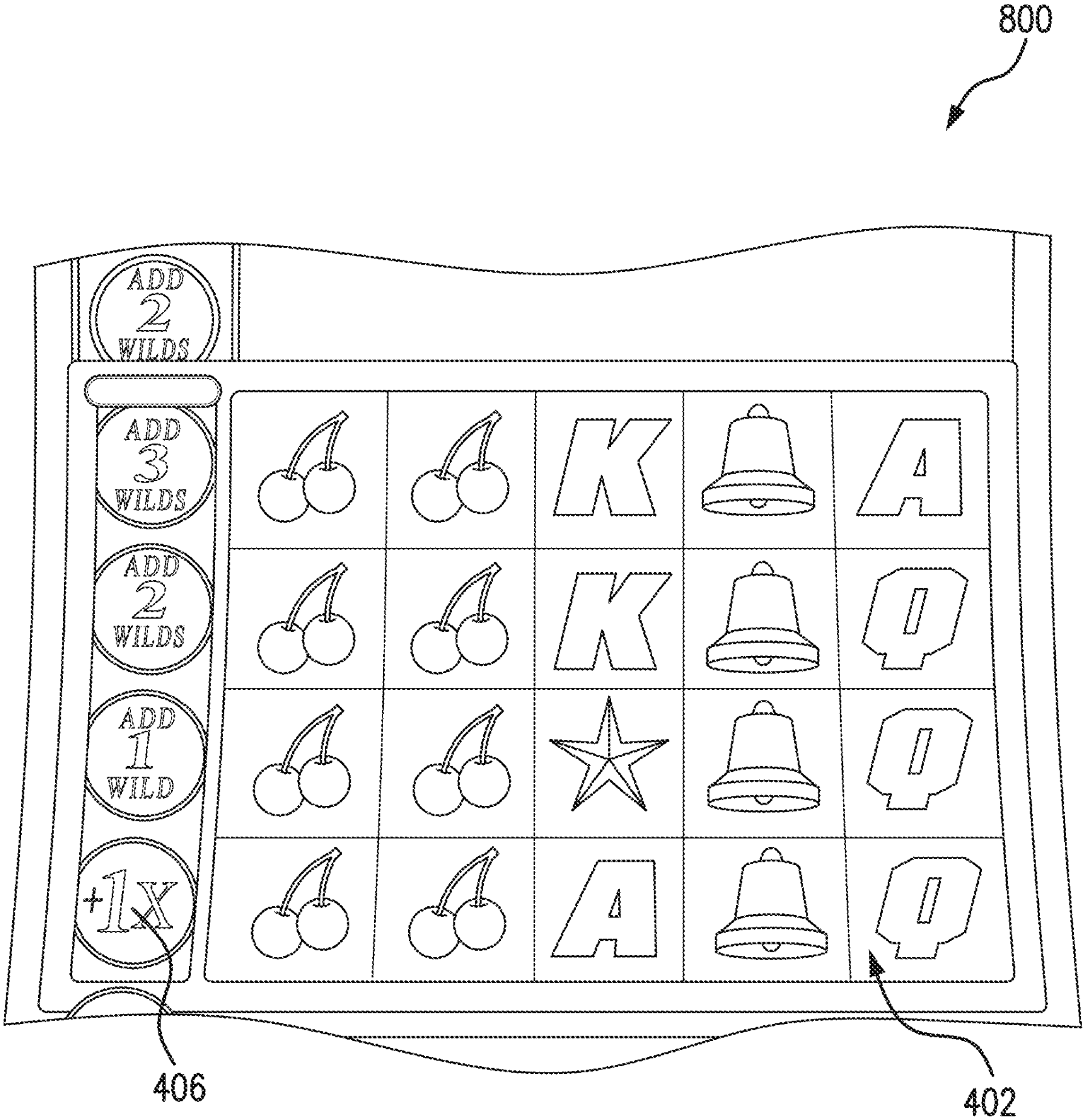
FIG. 8 is an example graphical interface of the wagering game shown in FIG. 4 at an outcome of a trigger round in accord with at least some aspects of the disclosed concepts.
Figure 9:
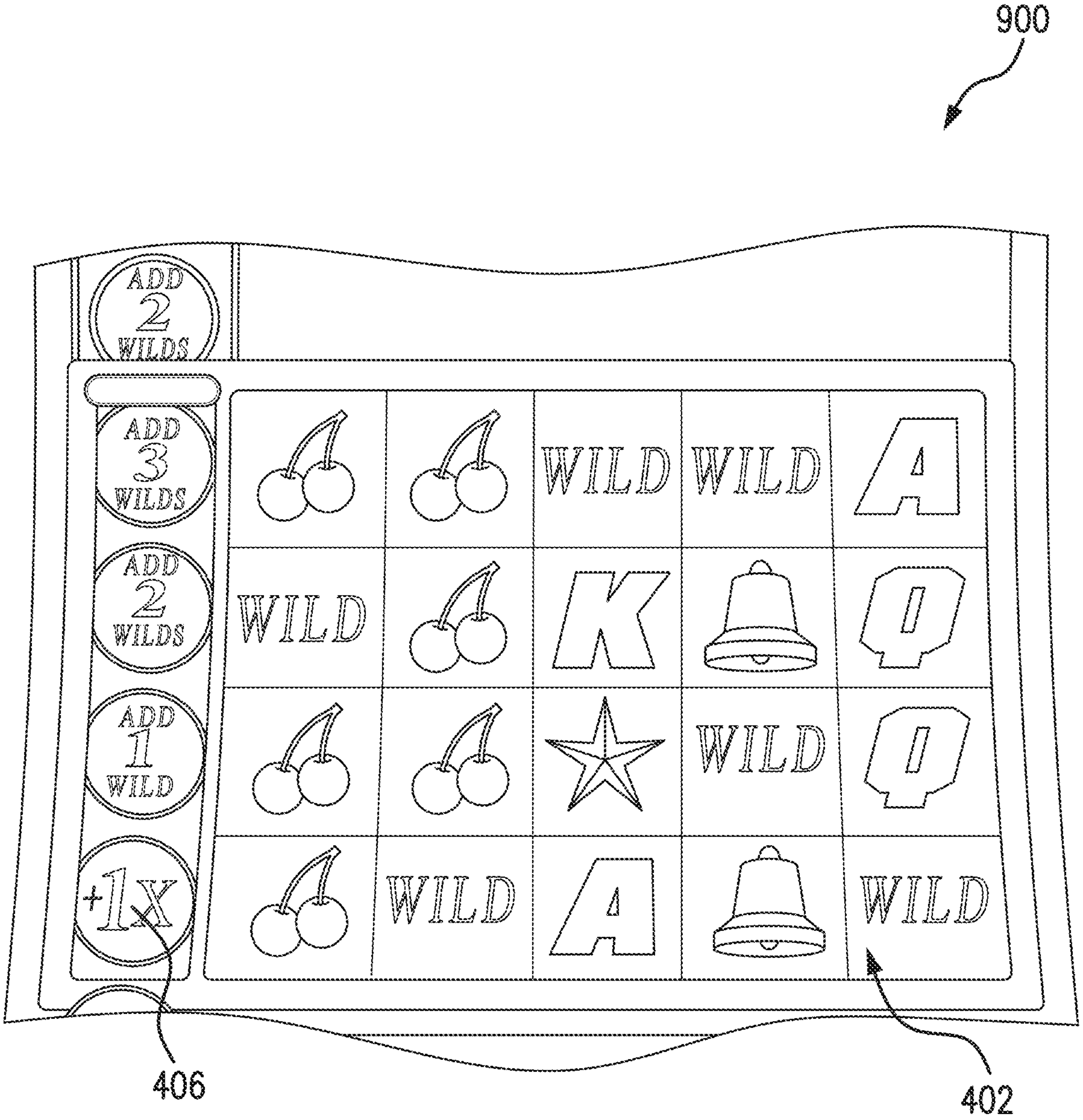
FIG. 9 is an example graphical interface of the wagering shown in FIG. 4 after selected modifiers have been applied to the outcome shown in FIG. 8 in accord with at least some aspects of the disclosed concepts.

FIG. 8 is an example gaming interface 800 depicting an outcome of a trigger round, and FIG. 9 is an example gaming interface 900 depicting the application of the modifiers 406 within the selected subarray to the outcome shown in FIG. 8. More specifically, the trigger round in this example occurs after the outcome shown in FIG. 7. The selected subarray includes two types of modifiers 406 that add wild symbols to the outcome and a multiplier that multiplies the award for any winning combination of symbols in the symbol array 402. In the example embodiment, six wild symbols are added to the symbol array 402 to replace other symbols in the outcome shown in the interface 800. The placement of the wild symbols may be randomly determined or at least partially predetermined. For example, some restrictions may be applied to the random placement of the wild symbols to avoid particular combinations of wild symbols (e.g., a central payline comprised of the wild symbols). In addition, the multiplier modifier doubles the award amount for each winning combination or symbol (i.e., +1× is added to a base payout of 1×). The game-logic circuitry 40 may apply the modifiers from the selected subarray and then determine if any awards should be provided to the player.

In the example embodiment, after modifiers 406 have been applied and the awards have been determined, the game-logic circuitry 40 resets the selected subarray. That is, the array size of the selected subarray is set back to a default size (in the depicted example, the default array size is three), and shifted to include new array positions from the modifier array 404. In other embodiments, other suitable functions may be performed to reset the selected subarray. For example, and without limitation, instead of shifting the subarray, a new modifier array 404 may be generated to replace the current modifier array 404, the selected subarray may "jump" to new array positions, or the modifier array 404 may be reorganized such that the modifiers 406 move to different symbol positions.

In at least some embodiments, the plurality of rounds may include a plurality of trigger rounds. For example, a bonus game feature may include a plurality of free rounds that include a plurality of trigger rounds, where the modifiers 406 of the selected subarray are applied in response to each trigger round. In certain embodiments, the selected subarray may not be reset in response to the trigger round during the plurality of free rounds, but rather is reset at the conclusion of the bonus game feature. The number and/or location of the trigger rounds may be randomly determined such that the bonus game feature may include different trigger rounds in each instance of the bonus game feature.

Figure 10:
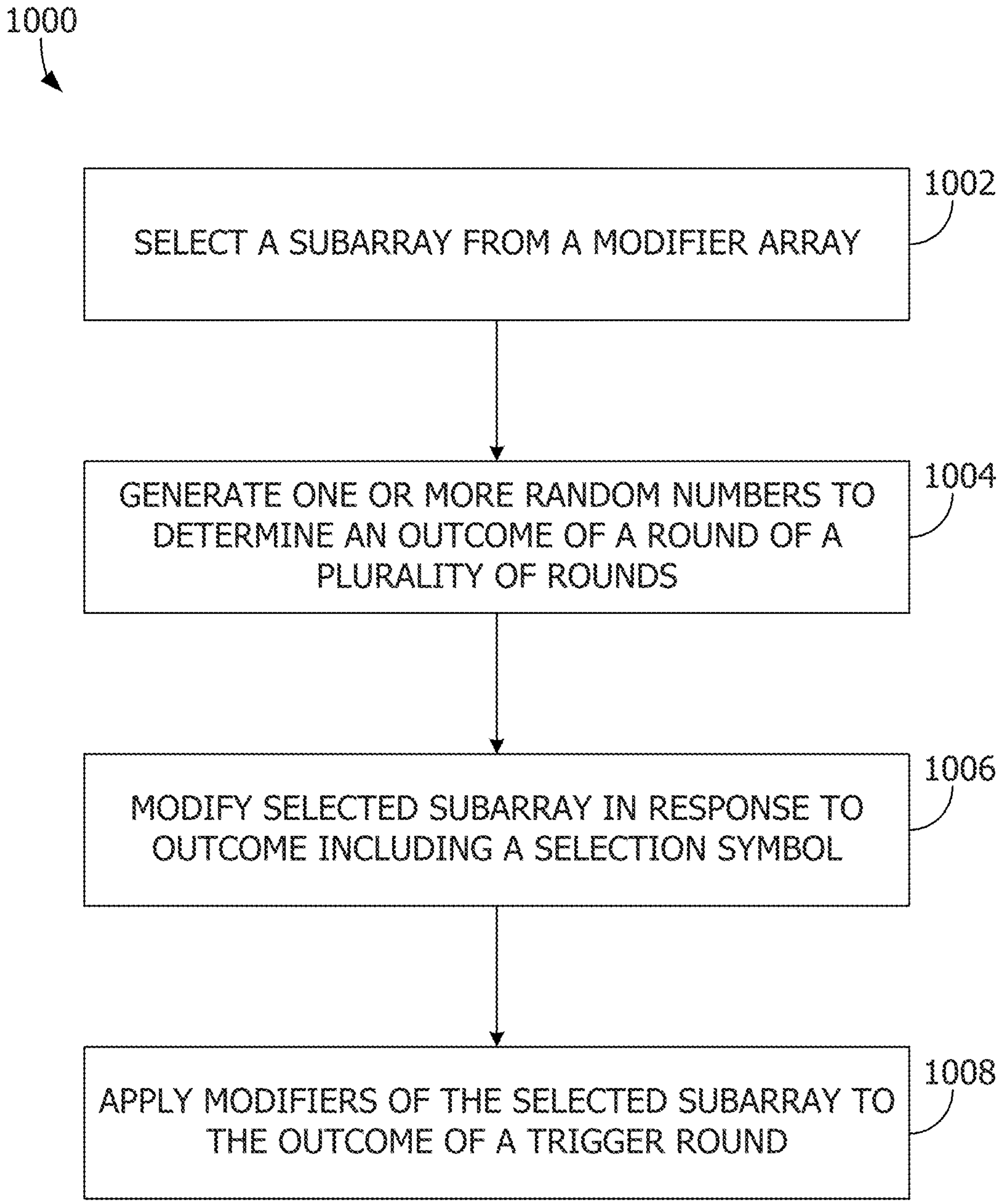
FIG. 10 is a flow diagram of an example method for administering a wagering game in accord with at least some aspects of the disclosed concepts.

FIG. 10 is a flow diagram of an example method 1000 for conducting a wagering game according to one or more aspects of the foregoing disclosure. More specifically, the method 1000 may be at least partially performed by the game-logic circuitry 40 (shown in FIG. 2). In other embodiments, the method 1000 may be at least partially performed by a different device, and the method 1000 may include addition, fewer, or alternative steps, including those described elsewhere herein.

With respect to FIGS. 4 and 10, the game-logic circuitry 40 selects 1002, for a plurality of rounds of populating the symbol array 402, a subarray of the modifier array 404. The game-logic circuitry 40 generates 1004, using a random-number generator, one or more random numbers to determine an outcome of a round of the plurality of rounds. The random numbers may be used, for example, to compare an outcome list, where the outcome matching the random number or numbers (either via direct comparison or as a function of the random numbers) is selected as the outcome of the round. In response to the outcome of the round including a selection symbol, the game-logic circuitry 40 modifies 1006 the selected subarray. Play of the game continues for the plurality of rounds, and further modification of the selected subarray may occur in response to round outcomes including additional selection symbols. The player may be awarded for winning outcomes occurring in the rounds outside of the trigger round, but the modifiers in the selected subarray are not yet applied.

In response to the trigger round (e.g., the final round in a predetermined number of rounds), the game-logic circuitry 40 applies 1008 the modifiers of the current selected subarray to the outcome associated with the trigger round. After the modifiers have been applied, the game-logic circuitry 40 determines whether or not any winning combinations are present. If winning combinations are detected, an associated award is provided to the player (which may be affected by one or more modifiers, such as the multiplier modifier shown in FIG. 9). The selected subarray may then be reset for the method 1000 to be repeated for a new plurality of rounds. The method 1000 may be repeated until the player initiates a cashout process by providing a cashout input. The game-logic circuitry 40 then may credit the player with any remaining credits within a credit balance associated with the player, either digitally (e.g., by applying the credit balance to a digital wallet) or physically (e.g., printing a ticket, dispensing bills and/or coins, etc.).

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming system comprising:

a gaming machine comprising a display device configured to display a symbol array comprising a plurality of symbols and a modifier array comprising a plurality of modifiers and blanks; and game-logic circuitry configured to:

select, for a plurality of rounds of populating the symbol array with symbols, a subarray of the modifier array, the selected subarray displayed by the display device;

generate, using a random-number generator of the game-logic circuitry, one or more random numbers to determine an outcome of a round of the plurality of rounds;

in response to the outcome of the round including an expansion symbol, enlarge the subarray to include an additional modifier from the modifier array, the additional modifier displayed by the display device; and in response to a trigger round of the plurality of rounds, cause the display device to apply the modifiers of the subarray to an outcome associated with the trigger round.

2. The gaming system of claim 1, wherein the expansion symbol increases the subarray by one array position for each expansion symbol.

3. The gaming system of claim 1, wherein the game-logic circuitry randomly determines how many array positions are added to the subarray for each expansion symbol.

4. The gaming system of claim 1, wherein the trigger round is a final round of the plurality of rounds.

5. The gaming system of claim 1, wherein the trigger round is a randomly selected round of the plurality of rounds.

6. The gaming system of claim 1, wherein a new subarray is selected from the modifier array in response to the outcome associated with the trigger round.

7. The gaming system of claim 1, wherein the plurality of modifiers includes a wild symbol modifier to replace a symbol populating the symbol array with a wild symbol.

8. The gaming system of claim 1, wherein the plurality of modifiers includes a multiplier modifier for increasing an award for a winning outcome.

9. The gaming system of claim 1, wherein the modifier array further includes a blank that does not apply any modifier or change when the modifiers of the subarray are applied to an outcome associated with the trigger round.

10. The gaming system of claim 1, wherein the game-logic circuitry is further configured to, in response to the outcome of the round including a blank elimination symbol, cause the display device to replace one or more modifiers within the selected subarray with a non-blank modifier.

11. A method of using a gaming system comprising game-logic circuitry and a gaming machine, the gaming machine having a display device in communication with the game-logic circuitry, the method comprising:

displaying, via the display device, a symbol array comprising a plurality of symbols and a modifier array comprising a plurality of modifiers;

selecting, by the game-logic circuitry and for a plurality of rounds of populating the symbol array with symbols, a subarray of the modifier array, the selected subarray displayed by the display device;

generating, using a random-number generator of the game-logic circuitry, one or more random numbers to determine an outcome of a round of the plurality of rounds;

in response to the outcome of the round including an expansion symbol, enlarging, by the game-logic circuitry, the subarray to include an additional modifier from the modifier array, the additional modifier displayed by the display device; and in response to a trigger round of the plurality of rounds, causing, by the game-logic circuitry, the display device to apply the modifiers of the subarray to an outcome associated with the trigger round.

12. The method of claim 11, wherein the expansion symbol increases the subarray by one array position for each expansion symbol.

13. The method of claim 11, wherein the game-logic circuitry randomly determines how many array positions are added to the subarray for each expansion symbol.

14. The method of claim 11, wherein the trigger round is a final round of the plurality of rounds.

15. The method of claim 11, wherein the trigger round is a randomly selected round of the plurality of rounds.

16. The method of claim 11, wherein a new subarray is selected from the modifier array in response to the outcome associated with the trigger round.

17. The method of claim 11, wherein the plurality of modifiers includes a wild symbol modifier to replace a symbol populating the symbol array with a wild symbol.

18. The method of claim 11, wherein the plurality of modifiers includes a multiplier modifier for increasing an award for a winning outcome.

19. The method of claim 11, wherein the modifier array further includes a blank that does not apply any modifier or change when the modifiers of the subarray are applied to an outcome associated with the trigger round.

20. The method of claim 11, wherein, in response to the outcome of the round including a blank elimination symbol, cause the display device, via the game-logic circuitry, to replace one or more modifiers within the selected subarray with a non-blank modifier.

* * * * *